Patented Oct. 24, 1922.

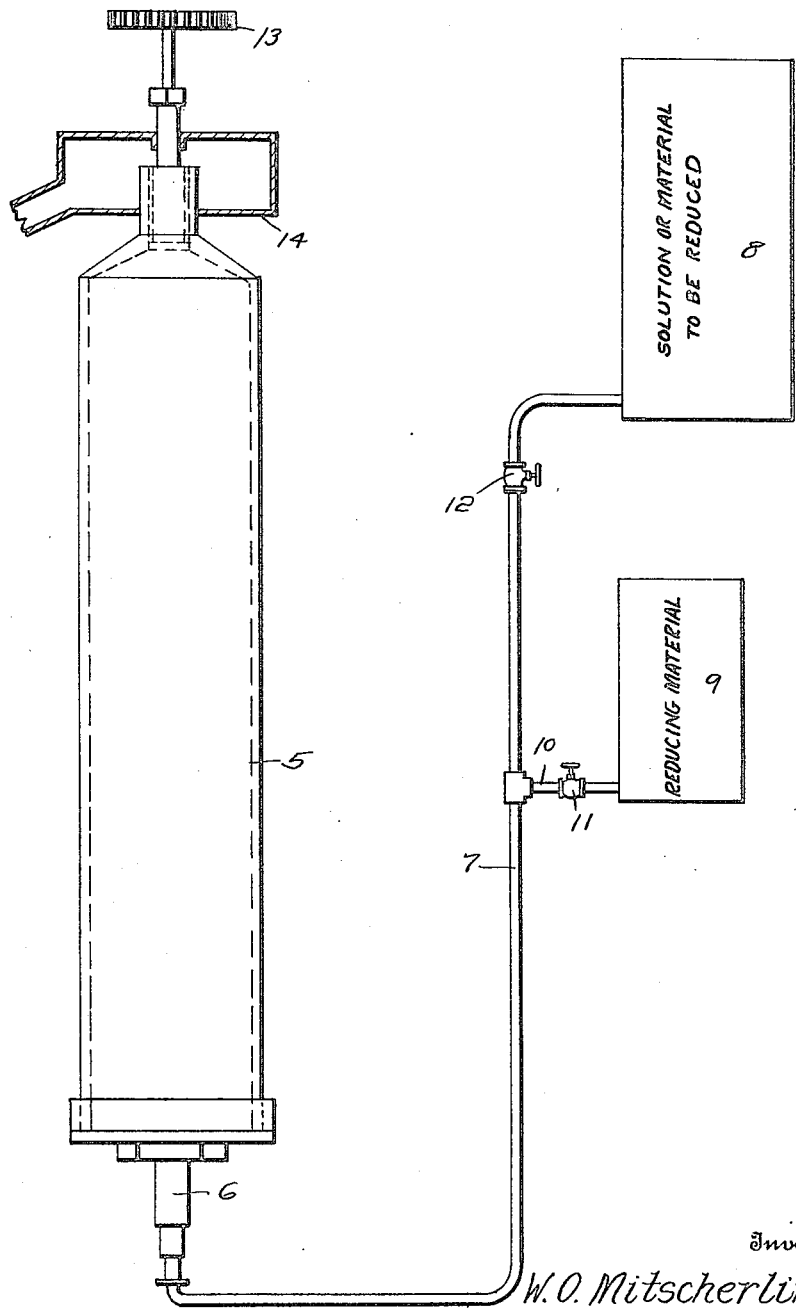

1,432,775

UNITED STATES PATENT OFFICE.

WALDEMAR OSCAR MITSCHERLING, OF WILMINGTON, DELAWARE, ASSIGNOR TO ATLAS POWDER COMPANY, OF WILMINGTON, DELAWARE, A CORPORATION OF DELAWARE.

PROCESS FOR CARRYING OUT ACID OR ALKALINE REDUCTIONS.

Application filed March 21, 1922. Serial No. 545,619.

*To all whom it may concern:*

Be it known that I, WALDEMAR OSCAR MITSCHERLING, a citizen of the United States, residing at Wilmington, in the county of New Castle and State of Delaware, have invented certain new and useful Improvements in Processes for Carrying Out Acid or Alkaline Reductions, of which the following is a specification.

This invention relates to a process for carrying out acid or alkaline reductions by means of zinc or iron or some other suitable metallic reducing agent in a rapidly rotating tube.

In many commercial chemical processes it is necessary to reduce some compound. This reduction may be simply the removal of oxygen or it may be the addition of hydrogen or both the removal of oxygen and the addition of hydrogen as the case may be. These reductions are usually carried out by treating the substance with active or nascent hydrogen which is formed by the action of acids on zinc or iron or by the action of alkalines on zinc or alcohols on metallic sodium. We do not wish to restrict the process with regards to the methods of generating hydrogen.

In the proposed process the reducing agent, e. g., zinc, iron, etc., is placed on the inside of a rapidly rotating tube and the solution containing the compound to be reduced is passed through the tube while it is rotating, and due to the centrifugal force the liquid near the walls of the tube is under considerable pressure. The hydrogen which is liberated by the reducing agent thus acts on the solution while it is under high pressure.

It has been customary to perform reductions in suitable tanks by means of adding iron filings to a nitro-compound in acid solution or zinc in alkaline solution. This, however, requires a very large excess (about 500–600% of the reducing agent) and as a consequence the reducing solutions have been very polluted with iron salts—respective zinc salts—which, of course, would have to be eliminated before the amino compound can be used. This, my invention, eliminates all this extra dissolved iron or zinc, as it is possible in a continuous reduction, to use only 50% more than theory of iron or zinc to perform a reaction.

The figure shown in the accompanying drawing is a diagrammatic view of an apparatus adapted to carry out the process.

In this drawing 5 designates the rotor of a supercentrifuge of a usual and well known construction such, for example, as a Sharples supercentrifuge. The inlet 6 of the centrifuge is connected by a pipe 7 with a tank or other container 8 which contains the solution or material to be reduced, e. g., nitrobenzol or naphthaline-nitrotrisulphonic acid. A second tank or container 9 receives the reducing material, such, for example, as zinc dust, or fine iron filings suspended in water. The pipe 7 is connected by a branch pipe 10 with the tank 9 and this pipe is in turn controlled by a valve 11. A second valve 12 provides means for controlling communication of the tank 8 with the supply 7 of the centrifuge. The shaft of the centrifuge is driven by a turbine 13. The outlet of the centrifuge is indicated at 14.

In practicing the invention, the iron or zinc suspended in water is introduced into the centrifuge through the pipe 7 by opening valve 11, the valve 12 at this time being closed. The metal, i. e., the iron or zinc will deposit upon the inner wall of the rotor 5. After a sufficient amount of the metal has been introduced into the rotor, the acid or alkaline solution to be reduced is fed continuously into the rotor through the pipe 7 by opening the valve 12 and closing the valve 11. This solution comes in contact with the metal deposited upon the wall of the rotor and is reduced. If, for example, an acid solution of the organic nitrates, to be reduced, is fed through the bowl of the centrifuge, the acid attacks the zinc on the walls of the bowl liberating hydrogen, this hydrogen in turn reduces the nitrate, for instance, to an amino compound. The liquid leaving the bowl will then be an acid solution of amino compound. As the metal in the bowl is used up it can be replaced by fresh metal, by again, temporarily, closing valve 12 and opening valve 11.

This method of reducing will also have the advantage of giving clarified solutions of the amino compound as the sediment will be thrown to the walls of the bowl. When necessary the bowl can be readily cleaned. A further advantage of this process is that the reduction will take place under pressure (the centrifugal force in the centrifuge creates a pressure of about 400 lbs. per square inch), thus reducing the loss of hydrogen inherent in reduction processes which are carried on in open kettles. In lessening the amount of hydrogen needed for reduction this process will also effect a saving in the amount of reducing agent needed and also reduces the amount of metal which will have to be removed from the solution by subsequent treatment.

It is to be understood that the invention is not limited to the precise arrangement shown but that it includes within its purview whatever changes fairly come within either the terms or the spirit of the appended claims.

Having described my invention what I claim is:

1. The herein described continuous reduction process which consists of introducing the reducing metallic medium into a rapidly rotating tube and then passing the solution to be reduced through said tube while rotating said tube at such rate of speed as to place the solution to be reduced under the pressure of centrifugal force.

2. A method as recited in claim 1 wherein clarification of the liquid reduced is effected by centrifugal action in said rotative tube.

In testimony whereof I affix my signature in the presence of two witnesses.

WALDEMAR OSCAR MITSCHERLING.

Witnesses:
CHARLOTTE C. KING,
THOMAS J. LAFFEY.